(12) United States Patent
Sekine (10) Patent No.: US 8,010,280 B2
(45) Date of Patent: Aug. 30, 2011

(54) VEHICLE TRAVEL SAFETY DEVICE

(75) Inventor: Hiroshi Sekine, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1159 days.

(21) Appl. No.: 11/727,478

(22) Filed: Mar. 27, 2007

(65) Prior Publication Data

US 2007/0233365 A1    Oct. 4, 2007

(30) Foreign Application Priority Data

Mar. 30, 2006    (JP) ................. 2006-095296

(51) Int. Cl.
*G01C 21/00* (2006.01)
(52) U.S. Cl. ....................... 701/200; 180/408
(58) Field of Classification Search .......... 701/200, 701/41, 42, 70, 48, 72; 180/408, 411, 422
See application file for complete search history.

(56) References Cited

U.S. PATENT DOCUMENTS

| | | | | |
|---|---|---|---|---|
| 6,199,011 | B1 * | 3/2001 | Matsuda | 701/208 |
| 2006/0041372 | A1 * | 2/2006 | Kubota et al. | 701/200 |
| 2007/0150157 | A1 * | 6/2007 | Lee et al. | 701/93 |

FOREIGN PATENT DOCUMENTS

| | | |
|---|---|---|
| JP | 7-73400 A | 3/1995 |
| JP | 8-287395 A | 11/1996 |
| JP | 2001-101566 A | 4/2001 |
| JP | 2001-108450 | 4/2001 |
| JP | 2002-290962 A | 10/2002 |
| JP | 2002-367080 A | 12/2002 |
| JP | 2004-94825 A | 3/2004 |
| JP | 2004-351977 A | 12/2004 |
| JP | 2005-123967 A | 5/2005 |
| JP | 2005-178577 A | 7/2005 |

* cited by examiner

*Primary Examiner* — Dalena Tran
(74) *Attorney, Agent, or Firm* — Arent Fox, LLP (57) ABSTRACT

This vehicle travel safety device improves the recognition accuracy of road shapes while preventing an extreme increase in the computation amount required for correction of road data. An inactive determination portion determines that the operating portion is inactive when a safety device does not operate for an estimated curve that is estimated by a curve estimating portion and also deceleration of a predetermined amount or more occurs by a deceleration operation of the driver before entering the estimated curve or while traveling through it, or when a safety device does not operate for an estimated curve that is estimated by a road shape estimating portion and also the vehicle condition of the self-vehicle is not in the proper vehicle condition to be able to properly pass the estimated curve. The data correcting portion changes the road data of the storage portion that is used in the detection of the recognized curve shape that corresponds to this estimated curve so as to facilitate operation of the operating portion at the estimated curve where the operating portion is determined to be inactive by the inactive determination portion, or adds new road data to the storage portion.

14 Claims, 4 Drawing Sheets

FIG. 5

VEHICLE TRAVEL SAFETY DEVICE

BACKGROUND OF THE INVENTION

1. Field of the Invention

The present invention relates to a vehicle travel safety device.

Priority is claimed on Japanese Patent Application No. 2006-095296, filed Mar. 30, 2006, the content of which is incorporated herein by reference.

2. Description of Related Art

There is conventionally known a navigation device in which node data including for example of the locations and shapes of roads are stored in advance in a data storage portion to serve as a database. During travel of a vehicle, the navigation device for example detects the travel locus based on the turning angle measured by a gyroscope and travel time calculated by a predetermined calculation process, compares the shape of the road in the node data with the shape of the travel locus, and corrects the database in the case of there existing a portion in which the shapes differ (for example, refer to Japanese Unexamined Patent Application, First Publication No. 2001-108450).

In the navigation device according to one example of the prior art mentioned above, during the execution of route guidance by the navigation device when the vehicle is traveling, the shape of a road in the node data and the shape of the travel locus are constantly compared. When the shape of the road in the node data and the shape of the travel locus differ, the device corrects the database appropriately. However, in the case of a travel locus in which the detected error relatively increases depending on the driving state of the driver, the correction processing of the database will be performed with excessive frequency. As a result, the problem arise in which the computation amount required for the correction processing surges.

The present invention was achieved in view of the above circumstances and has as its object to provide a vehicle travel safety device that is capable of improving the recognition accuracy of road shapes while preventing an extreme increase in the computation amount required for correction of road data.

SUMMARY OF THE INVENTION

In order to solve the aforementioned problem to achieve the object, the vehicle travel safety device according to the present invention includes a storage portion that stores node information and curve information from roads as road data; a self-vehicle position detecting portion that detects the position of a self-vehicle; a curve recognizing portion that recognizes the shape of a curve that exists in the traveling direction of the self-vehicle based on the road data; a vehicle condition detecting portion that detects the vehicle condition of the self-vehicle; a proper vehicle condition setting portion that sets a proper vehicle condition to be able to properly pass a curve based on the shape of the curve recognized by the curve recognizing portion; a comparing portion that compares the vehicle condition detected by the vehicle condition detecting portion and the proper vehicle condition set by the proper vehicle condition setting portion; an operating portion that operates a safety device provided in the self-vehicle when the vehicle condition of the self-vehicle is not in the proper vehicle condition according to the comparison result of the comparing portion; an operation presence determining portion that determines the presence or absence of an operation of the operating portion; and a correcting portion that corrects the road data so as to facilitate operation by the operating portion at a curve where the operating portion is determined to be inactive according to the determination result of the operation presence determining portion, wherein the operation presence determining portion determines that the operating portion is inactive when the safety device does not operate for a recognized curve that is recognized by the curve recognizing portion and also deceleration of a predetermined amount or more occurs by a deceleration operation of the driver before entering the recognized curve or while traveling through it.

Also, the vehicle condition may be constituted to be defined by at least one of vehicle speed, wheel speed, yaw rate, and lateral acceleration.

In the case that the safety device does not operate for a recognized curve and also deceleration of a predetermined amount or more occurs by a deceleration operation of the driver before entering the recognized curve or while traveling through it, this vehicle travel safety device corrects the road data so as to facilitate operation of the operating portion with respect to a curve where the operating portion is determined to be inactive. Thereby, even for example in a state where a curve shape cannot be recognized from the road data, it is possible to improve the road shape recognition accuracy and it is possible to properly reflect the will of the driver in the travel state of the vehicle while passing through the curve.

Also, the vehicle travel safety device according to the present invention includes a storage portion that stores node information and curve information from roads as road data; a self-vehicle position detecting portion that detects the position of a self-vehicle; a curve recognizing portion that recognizes the shape of a curve that exists in the traveling direction of the self-vehicle based on the road data; a vehicle condition detecting portion that detects the vehicle condition of the self-vehicle; a proper vehicle condition setting portion that sets a proper vehicle condition to be able to properly pass a curve based on the shape of the curve recognized by the curve recognizing portion; a comparing portion that compares the vehicle condition detected by the vehicle condition detecting portion and the proper vehicle condition set by the proper vehicle condition setting portion; an operating portion that operates a safety device provided in the self-vehicle when the vehicle condition of the self-vehicle is not in the proper vehicle condition according to the comparison result of the comparing portion; an operation presence determining portion that determines the presence or absence of an operation of the operating portion; and a correcting portion that corrects the road data so as to facilitate operation by the operating portion at a curve where the operating portion is determined to be inactive according to the determination result of the operation presence determining portion, wherein the operation presence determining portion determines that the operating portion is inactive when the safety device does not operate for a recognized curve that is recognized by the curve recognizing portion and also the lateral acceleration of the self-vehicle at the time of passing the recognized curve is greater than a proper lateral acceleration that is set by the proper vehicle condition setting portion by a predetermined amount or more.

Also, the vehicle condition may be constituted to be defined by at least one of vehicle speed, wheel speed, yaw rate, and lateral acceleration.

When the safety device does not operate for a recognized curve and also the lateral acceleration at the time of passing the recognized curve is greater than a proper lateral acceleration by a predetermined amount or more, this vehicle travel safety device corrects the road data to facilitate operation of the operating portion with respect to a curve where the operating portion is determined to be inactive. Thereby, even for example in a state where a curve shape cannot be recognized from the road data, it is possible to improve the road shape recognition accuracy and it is possible to properly reflect the will of the driver in the travel state of the vehicle while passing through the curve.

Also, the vehicle travel safety device according to the present invention includes a storage portion that stores node information and curve information according to roads as road data; a self-vehicle position detecting portion that detects the position of a self-vehicle; a curve recognizing portion that recognizes the shape of a curve that exists in the traveling direction of the self-vehicle based on the road data; a vehicle condition detecting portion that detects the vehicle condition of the self-vehicle; a first proper vehicle condition setting portion that sets a first proper vehicle condition to be able to properly pass a curve based on the shape of the curve recognized by the curve recognizing portion; a comparing portion that compares the vehicle condition detected by the vehicle condition detecting portion and the first proper vehicle condition set by the first proper vehicle condition setting portion; an operating portion that operates a safety device provided in the self-vehicle when the vehicle condition of the self-vehicle is not in the first proper vehicle condition according to the comparison result of the comparing portion; a curve estimating portion that estimates an actual curve shape and actual curve position based on the vehicle condition of the self-vehicle; an operation presence determining portion that determines the presence or absence of an operation of the operating portion; a correcting portion that corrects the road data so as to facilitate operation by the operating portion at a curve where the operating portion is determined to be inactive according to the determination result of the operation presence determining portion; and a second proper vehicle condition setting portion that sets a second proper vehicle condition to be able to properly pass the estimated curve based on the shape of the estimated curve estimated by the curve estimating portion, wherein the operation presence determining portion determines that the operating portion is inactive when the safety device does not operate for the estimated curve that is estimated by the curve estimating portion and also the vehicle condition of the self-vehicle is not in the second proper vehicle condition.

Also, the vehicle condition may be constituted to be defined by at least one of vehicle speed, wheel speed, yaw rate, and lateral acceleration.

When the safety device does not operate for an estimated curve and also the vehicle condition of the self-vehicle is not in the second proper vehicle condition to be able to properly pass the estimated curve, this vehicle travel safety device corrects the road data to facilitate operation of the operating portion for a curve where the operating portion is determined to be inactive. Thereby, even for example in a state where a curve shape cannot be recognized from the road data, it is possible to improve the road shape recognition accuracy and it is possible to properly pass through the curve.

Moreover, based on the aforementioned invention, the second proper vehicle condition setting portion may set a proper speed as the second proper vehicle condition, and the operation presence determining portion may determine that the operating portion is inactive when the safety device does not operate for the estimated curve that is estimated by the curve estimating portion and also the speed of the self-vehicle when passing through the estimated curve is greater than the proper speed by a predetermined value or more.

It is therefore possible to properly determine the presence or absence of an operation of the operating portion, and even in a state where a curve shape cannot be recognized from the road data, it is possible to improve the road shape recognition accuracy and it is possible to properly pass through the curve.

Moreover, based on the aforementioned invention, the second proper vehicle condition setting portion may set a proper lateral acceleration as the second proper vehicle condition, and the operation presence determining portion may determine that the operating portion is inactive when the safety device does not operate for the estimated curve that is estimated by the curve estimating portion and the lateral acceleration of the self-vehicle when passing through the estimated curve is greater than the proper lateral acceleration by a predetermined value or more.

It is therefore possible to properly determine the presence or absence of an operation of the operating portion, and even for example in a state where a curve shape cannot be recognized from the road data, it is possible to improve the road shape recognition accuracy and it is possible to properly pass through the curve.

Moreover, based on the aforementioned invention, a course predicting portion that predicts the course of the self-vehicle based on the road data and a predicted course changing portion that changes the predicted course predicted by the course predicting portion may be additionally provided, wherein the operation presence determining portion may determine that the operating portion is inactive when, due to the actual route on which the self-vehicle is traveling differing from the predicted course predicted by the course predicting portion, the safety device does not operate for a curve on the actual route and also deceleration of a predetermined amount or more occurs by a deceleration operation of the driver before entering the curve on the actual route or while traveling through it, and the predicted course changing portion may change the predicted course predicted by the course predicting portion so that the operating portion operates for the curve on the actual route during the next travel in the case that the operating portion is determined to be inactive for the curve on the actual route by the operation presence determining portion.

Therefore, even in the case where the operating portion is determined to be inactive due to the actual route on which the self-vehicle travels and the predicted road differing, it is possible to properly pass through the curve during the next travel by changing the predicted course.

Moreover, based on the aforementioned invention, a course predicting portion that predicts the course of the self-vehicle based on the road data and a predicted course changing portion that changes the predicted course predicted by the course predicting portion may be provided, wherein the operation presence determining portion may determine that the operating portion is inactive when, due to the actual route on which the self-vehicle is traveling differing from the predicted course predicted by the course predicting portion, the safety device does not operate for a curve on the actual route and also the lateral acceleration of the self-vehicle when passing through the curve on the actual route is greater than the proper lateral acceleration set by the proper vehicle condition setting portion by a predetermined value or more, and the predicted course changing portion may change the predicted course predicted by the course predicting portion so that the operating portion operates for the curve on the actual route during the next travel in the case that the operating portion is determined to be inactive for the curve on the actual route by the operation presence determining portion.

Therefore, even in the case where the operating portion is determined to be inactive due to the actual route on which the self-vehicle travels and the predicted road differing, it is possible to properly pass through the curve during the next travel by changing the predicted course.

DETAILED DESCRIPTION OF THE INVENTION

The vehicle travel safety device according to one embodiment of the present invention shall be described below with reference to the attached drawings.

Figure 1:
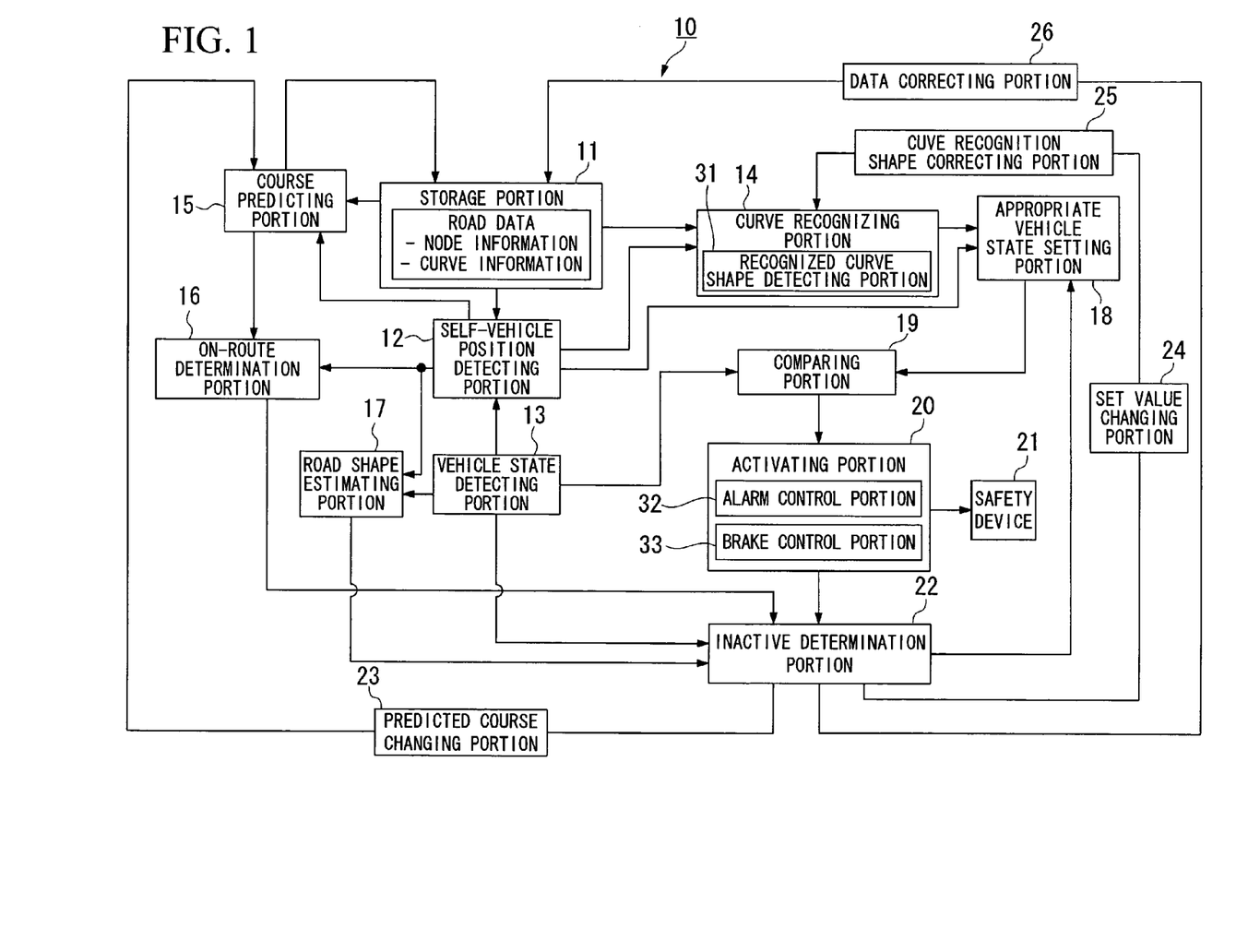
FIG. 1 is a function block diagram showing the constitution of the vehicle travel safety device according to one embodiment of the present invention.

As shown in FIG. 1, a vehicle travel safety device 10 according to the present embodiment is constituted with a storage portion 11, a self-vehicle position detecting portion 12, a vehicle condition detecting portion 13, a curve recognizing portion 14, a course predicting portion 15, an on-route determining portion 16, a road shape estimating portion 17, a proper vehicle condition setting portion (first proper vehicle condition setting portion) 18, a comparing portion 19, an operating portion 20, a safety device 21 equipped with a break actuator (not shown) and an alarm device (not shown), an inactive determination portion (operation presence determining portion, second proper vehicle condition setting portion) 22, a predicted course changing portion 23, a set value changing portion 24, a curve recognition shape correcting portion 25, and a data correcting portion (correcting portion) 26.

The storage portion 11 stores node information and curve information of roads as road data. The node information is, for example, data of coordinate points for grasping road shapes. The curve information, for example, includes information related to the curvature of a curve (for example, the curvature, radius R, and polarity of a curve) and information related to the depth of a curve (for example, the turning angle θ required for passage of a curve, the length of a curve, etc.) in addition to the start point and the end point of a curve set on a link (that is, a line which connects nodes).

The self-vehicle position detecting portion 12 calculates the present position of the self-vehicle by autonomous navigation calculation processing based on global positioning system (GPS) signals that locate the position of the vehicle using a satellite, positioning signals such as differential GPS (DGPS) signals for improving the positioning accuracy by correcting errors in the GPS signals using an appropriate base station, and detection signals that are output from the vehicle condition detecting portion 13 described below.

Moreover, the self-vehicle position detecting portion 12 performs map matching based on the calculated present position of the self-vehicle and road data acquired from the storage portion 11, and corrects the result of the position estimation by the autonomous navigation.

The vehicle condition detecting portion 13 is constituted by a speed sensor or wheel-speed sensor that detects the present speed of the self-vehicle, and a gyro sensor or a yaw rate sensor which detects the orientation of the self-vehicle on the horizontal plane (the yaw angle which is the angle of rotation of the vehicle's center of gravity about the vertical axis), the inclination angle with respect to the vertical direction (the inclination angle of the fore-aft direction axis of the self-vehicle with respect to the vertical direction), the change rate of the yaw angle (yaw rate), and the change rate of the inclination angle, etc. These detection signals are output to the self-vehicle position detecting portion 12, and the comparing portion 18 and inactive determination portion 22 described below.

The curve recognizing portion 14 acquires road data that is stored in the storage portion 11, and based on this road data, recognizes curves that exist on roads in a predetermined range ahead in the traveling direction from the present position of the self-vehicle. For example, the curve recognizing portion 14 recognizes the shape of a curve (recognized curve shape) based on the node information, i.e., coordinate portions for grasping the road shape, and link information which includes lines linking the nodes.

The curve recognizing portion 14 is provided for example with a recognized curve shape detecting portion 31. The recognized curve shape detecting portion 31 detects the position and shape of a curve that is recognized ahead in the traveling direction of the self-vehicle (for example, the radius R of a curve, curvature and turning angle θ, the length of the curve, and the depth of the curve, etc.) based on the curve information included in the acquired road data, and outputs them to the proper vehicle condition setting portion 18.

The course predicting portion 15 for example calculates the predicted course used for route guidance by a navigation device (not shown) based on the present position of the self-vehicle that is output from the self-vehicle position detecting portion 12 and the road data that is stored in the storage portion 11.

The on-route determining portion 16 determines whether or not the present position of the self-vehicle as detected by the self-vehicle position detecting portion 12 is in the state of being positioned on the predicted course that is predicted by the course predicting portion 15 (i.e., matching normal state) and whether or not the present position of the self-vehicle is in the state of being positioned on a road in accordance with road data that is stored in the storage portion 11 (i.e., in the on-route state), and outputs these determination results to the inactive determination portion 22.

The road shape estimating portion 17 estimates a curve that actually exists (actual curve) on the travel route that the self-vehicle is traveling based on the present position of the self-vehicle output by the self-vehicle position detecting portion 12 and the vehicle condition of the self-vehicle output from the vehicle condition detecting portion 13 (for example, the present speed and yaw rate, etc.) and outputs this estimation result as the estimated curve.

Moreover, the road shape estimating portion 17 estimates the actual shape of this curve (for example, the start point and end point, polarity, radius R, turning angle θ, and the like of the actual curve) based on the passage state of the self-vehicle with respect to the estimated curve that is estimated, and outputs it as the estimated curve shape.

The road shape estimating portion 17 regards the state in which the curvature calculated from the travel speed and the yaw rate of the self-vehicle being equal to or greater than a predetermined value as the state of passage through an actual curve, and recognizes the time interval or point interval of this passage state as the curve interval of the actual curve. The radius R is then calculated based on the bearing deviation amount in the recognized curve interval, that is, the time quadrature value of a yaw rate, and the travel distance in the curve interval.

In addition, the radius R of the actual curve may be for example an appropriate radius in the curve interval (for example, the maximum radius or the minimum radius), and may for example be the average radius with respect to a plurality of radii detected in the curve interval.

The proper vehicle condition setting portion 18 calculates the speed at which the vehicle can properly pass the recognized curve (proper speed) based on the recognized curve shape that is recognized by the curve recognizing portion 14, and outputs the proper speed to the comparing portion 19.

Also, the proper vehicle condition setting portion 18 calculates the lateral acceleration that is allowed (proper lateral acceleration) when properly passing through a recognized curve with respect to the acceleration (lateral acceleration) that is generated in the lateral direction of the self-vehicle when passing through a curve, and is able to calculate the proper speed from this proper lateral acceleration.

The comparing portion 19 compares the present speed of the self-vehicle that is detected by the vehicle condition detecting portion 13 and the proper speed that is set by the proper vehicle condition setting portion 18, and outputs this comparison result to the operating portion 20.

Based on the comparison result of the comparing portion 19, the operating portion 20 controls the operation of an alarm control portion 32 and a deceleration control portion which includes an engine control portion (not shown), a transmission control portion (not shown), and a brake control portion 33. For example, in the comparison result of the comparing portion 19, in the case of the self-vehicle not being in the proper vehicle condition due to being in a condition in which the present speed that is detected is higher than the proper speed, the operating portion 20 operates the warning device of the safety device 21 via the alarm control portion 32 to alert the driver and decelerates the self-vehicle automatically by operating a brake actuator of the safety device 21 via the brake control portion 33.

The inactive determination portion 22 determines the existence of an operation of the operating portion 20 based on the detection result of the vehicle condition detecting portion 13, the determination result of the on-route determining portion 16, the estimation result of the road shape estimating portion 17, and the control signal output from the operating portion 20.

For example, the inactive determination portion 22 determines that the operating portion 20 is inactive when the safety device 21 does not operate for an estimated curve that is estimated by the road shape estimating portion 17 and also deceleration of a predetermined value or greater occurs by a deceleration operation of the driver before entering an estimated curve or while traveling through it, or when the safety device 21 does not operate for an estimated curve that is estimated by the road shape estimating portion 17 and also the vehicle condition of the self-vehicle is not in the proper vehicle condition to be able to properly pass the estimated curve (for example, in the case of the speed of the self-vehicle when passing the estimated curve being greater than the proper speed by a predetermined value or more, or in the case of the lateral acceleration of the self-vehicle when passing the estimated curve being greater than the proper lateral acceleration by a predetermined value or more).

The predicted course changing portion 23 changes the predicted course that is predicted by the course predicting portion 15 so that the operating portion 20 operates for a curve on the travel locus during the next travel in the case that the operating portion 20 is determined to be inactive by the inactive determination portion 22.

Figure 2:
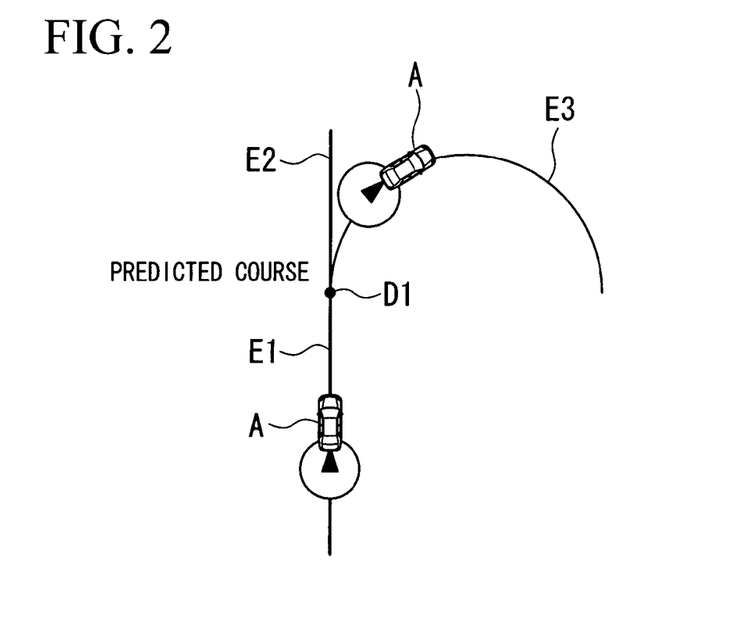
FIG. 2 is a drawing showing the warning operation timing when a vehicle enters a curve.

As shown for example in FIG. 2, in the state of there existing a branch portion D1, from which branch a travel route E2 including a straight road and a travel route E3 including a curve, ahead in the traveling direction of the self-vehicle A while traveling along the travel route E1, in the case of the safety device 21 not operating by the travel route E2 including a straight road being set as the predicted course by the course predicting portion 15, and, in reality, deceleration equal to or greater than a predetermined value occurring from a deceleration operation of the driver by the self-vehicle A having traveled over the travel route E3 including a curve and the estimated curve shape being estimated by the road shape estimating portion 17, a change is performed so that the travel route E3 including a curve is set as the predicted course during the next travel.

The set value changing portion 24 changes the set value for correcting the recognized curve shape that is recognized by the curve recognizing portion 14 so that the operating portion 20 operates for a curve on the travel locus during the next travel in the case that the operating portion 20 is determined to be inactive by the inactive determination portion 22 and outputs it to the curve recognition shape correcting portion 25.

The curve recognition shape correcting portion 25 corrects the recognized curve shape that is recognized by the curve recognizing portion 14 in accordance with the set value that is input from the set value changing portion 24.

Figure 3:
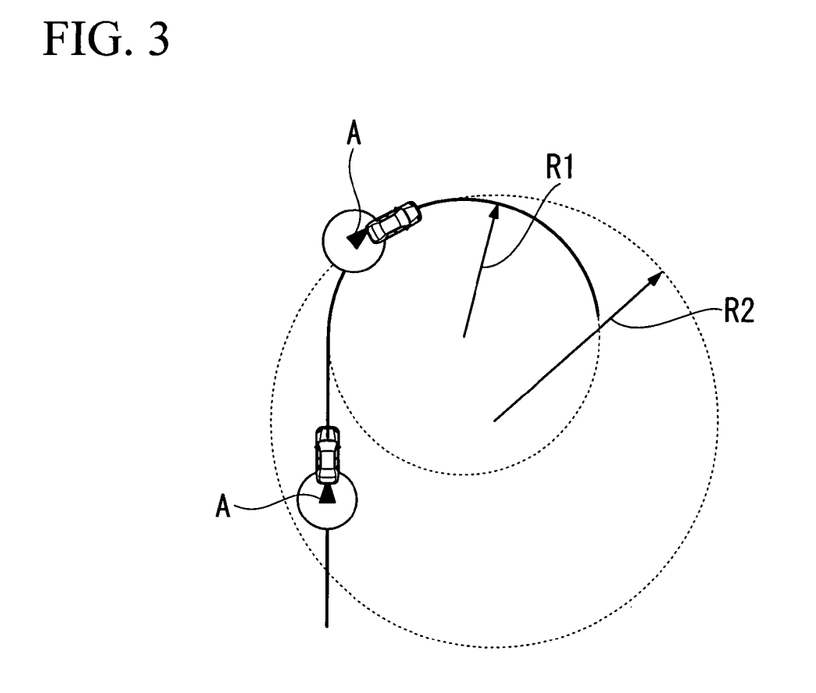
FIG. 3 is a diagram showing an example of the curve diameters of an actual curve and a mapped curve.

As shown for example in FIG. 3, at a curve that exists ahead in the traveling direction of the self-vehicle A, in the case during the previous travel of the recognized curve shape that is recognized by the curve recognizing portion 14 (for example, the radius R1) and the estimated curve shape that is estimated by the road shape estimating portion 17 (for example, radius R2 (<R1)) differing, for example the safety device 21 not operating for the recognized curve shape of the relatively larger radius R1 and deceleration equal to or greater than a predetermined value actually occurring from a deceleration operation of the driver for the estimated curve of the relatively smaller radius R2, during the current travel the curve recognition shape correcting portion 25 performs correction so that the recognized curve shape has the relatively smaller radius R2.

The data correcting portion 26 changes the road data of the storage portion 11 that is used in the detection of the recognized curve shape that corresponds to this estimated curve so as to facilitate operation of the operating portion 20 at the estimated curve where the operating portion 20 is determined to be inactive by the inactive determination portion 22, or adds new road data to the storage portion 11.

That is, the data correcting portion 26 changes the road data of the storage portion 11 that is used in the detection of the recognized curve shape so that the recognized curve shape and the estimated curve shape are equivalent in the case of the operating portion 20 being determined to be inactive at the estimated curve by the inactive determination portion 22 in the state of the recognized curve shape and the estimated curve shape differing in the comparison result of the recognized curve shape and the estimated curve shape, or adds new road data to the storage portion 11.

Here, the data correcting portion 26 determines whether or not the recognized curve and the actual curve are identical based for example on the comparison result of the recognized curve shape and the estimated curve shape by the comparing portion 16.

The vehicle travel safety device 10 according to the present embodiment is provided with the aforedescribed constitution. Next, the operation of the vehicle travel safety device 10 shall be described with reference to the attached drawings.

First, the process of determining whether or not to operate, for example, the brake actuator (not shown) as the safety device 21 at a curve that exists in the travel direction shall be described.

Figure 4:
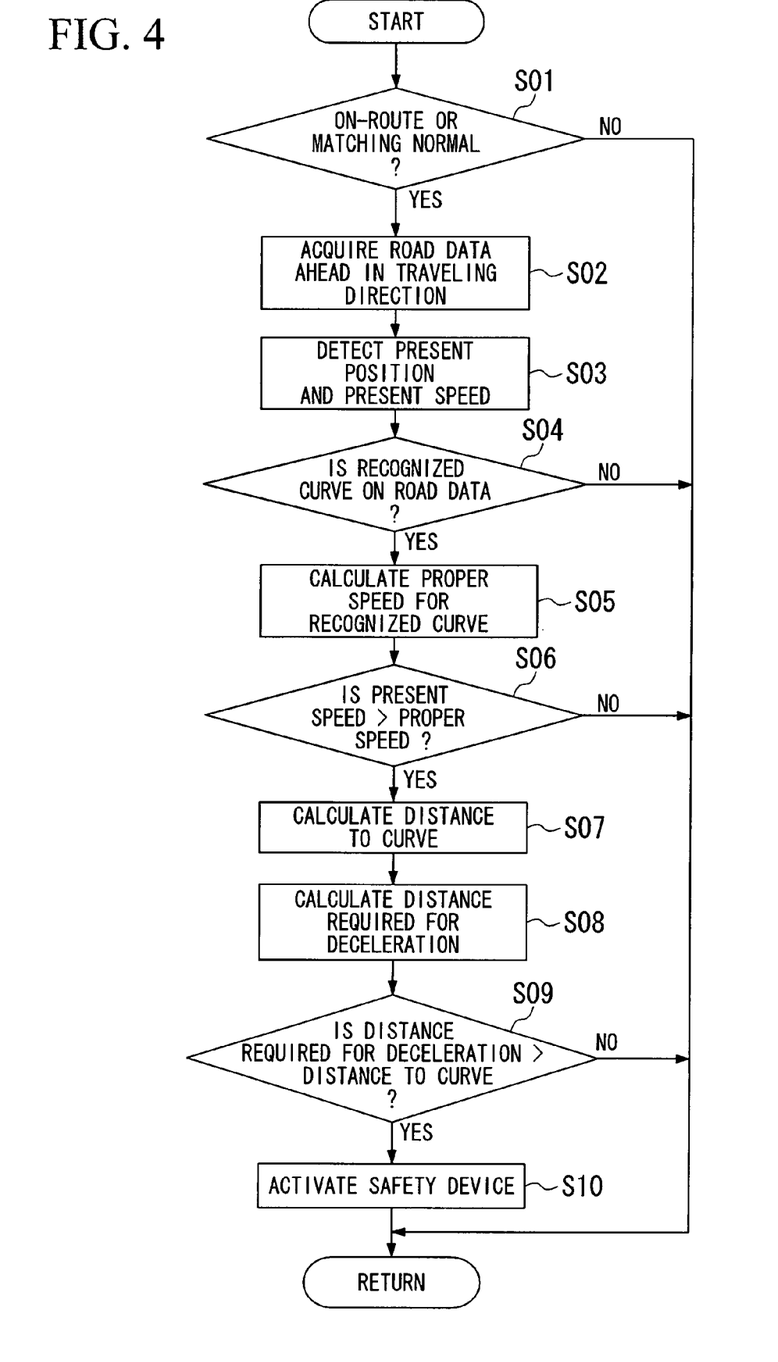
FIG. 4 is a flowchart showing an example of the operation of the vehicle travel safety device according to one embodiment of the present invention.

In step S01 shown in FIG. 4, it is determined whether or not the present position of the self-vehicle as detected by self-vehicle position detecting portion 12 is in a state of being positioned on the predicted course that is predicted by the course predicting portion 15 (i.e., the matching normal state) and also in the state of being positioned on a road in accordance with the road data that is stored in the storage portion 11 (i.e., in the on-route state).

When the determination result is "NO", the series of processes is ended.

On the other hand, when the determination result is "YES", the process proceeds to step S02.

Next, in step S02, the road data in a predetermined range ahead in the traveling direction of the self-vehicle is acquired from the storage portion 11.

Then, in step S03, the present position and the present speed of the self-vehicle are detected.

In step S04, it is determined whether or not a curve that exists on a road in a predetermined range ahead in the traveling direction from the present position of the self-vehicle is recognized (recognized curve).

When the determination result is "NO", the series of processes is ended.

On the other hand, when the determination result is "YES", the process proceeds to step S05.

In step S05, a proper speed for properly passing the recognized curve is calculated.

Next, in step S06, it is determined whether or not the present speed of the self-vehicle is greater than the proper speed.

When the determination result is "NO", the series of processes is ended.

On the other hand, when the determination result is "YES", the process proceeds to step S07.

In step S07, the distance from the present position of the self-vehicle to the entrance position of the recognized curve (distance to curve) is calculated.

Next, in step S08, the distance that is required when decelerating by a predetermined deceleration until reaching the entrance position of the recognized curve (deceleration required distance) is calculated in order for the self-vehicle to pass the recognized curve at the proper speed.

In step S09, it is determined whether or not the deceleration required distance is longer than the distance to the curve.

When the determination result is "NO", the series of processes is ended.

On the other hand, when the determination result is "YES", the process proceeds to step S10.

In step S10, the brake actuator of the safety device 21 is activated, and the series of processes is ended.

Hereinbelow follows a description of the nonoperation learning process, that is, the operation of the curve recognition shape correcting portion 25 and the data correcting portion 26.

Figure 5:
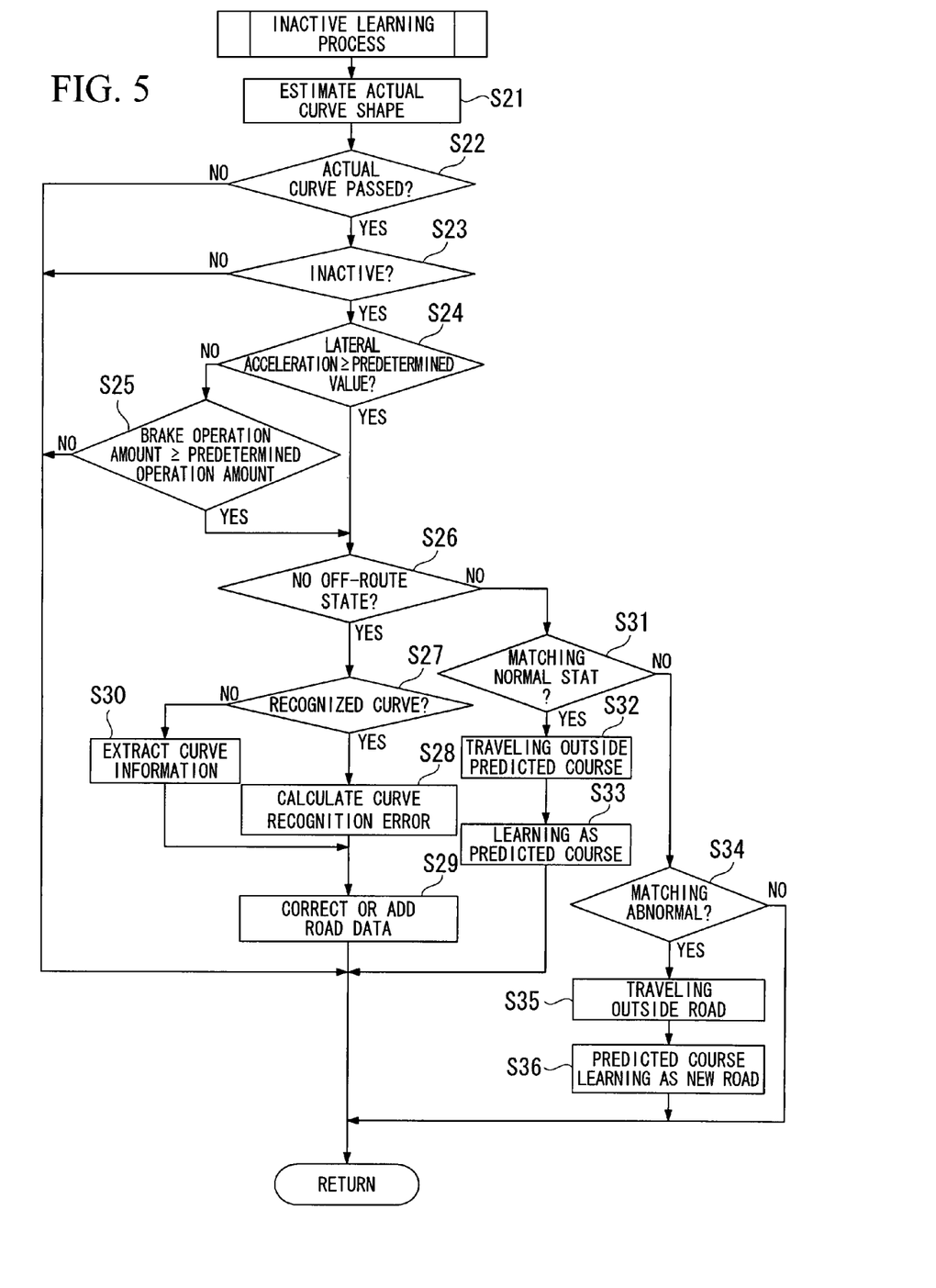
FIG. 5 is a flowchart showing an example of the operation of the vehicle travel safety device according to one embodiment of the present invention.

First, in step S21 shown for example in FIG. 5, the shape of the actual curve is estimated.

Next, in step S22, it is determined whether or not the actual curve has been passed.

When the determination result is "NO", the series of processes is ended.

On the other hand, when the determination result is "YES", the process proceeds to step S23.

In step S23, it is determined whether or not the operating portion 20 was inactive for the actual curve that was passed.

When the determination result is "NO", the series of processes is ended.

On the other hand, when the determination result is "YES", the process proceeds to step S24.

In step S24, it is determined whether or not the lateral acceleration at the time of passing the actual curve was equal to or greater than a predetermined value.

When the determination result of step S24 is "YES", the process proceeds to step S26 described below.

On the other hand, when the determination result of step S24 is "NO", the process proceeds to step S25.

In step S25, it is determined whether or not the brake operation amount by the driver before entering the actual curve or while traveling through it was equal to or greater than a predetermined brake operation amount.

When the determination result of step S25 is "NO", the series of processes is ended.

On the other hand, when the determination result of step S25 is "YES", the process proceeds to step S26.

In step S26, it is determined whether or not the on-route state has been continued.

When the determination result is "NO", the process proceeds to step S31 described below.

On the other hand, when the determination result is "YES", the process proceeds to step S27.

In step S27, it is determined whether or not the recognized curve is recognized based on the road data.

When the determination result of step S27 is "YES", the process proceeds to step S28. In step S28, the difference between the estimated curve shape and the recognized curve shape at the actual curve (that is, the curve recognition error which is the error of the recognized curve shape) is calculated.

In step S29, the curve information of the road data that is stored in the storage portion 11 is corrected in accordance with the curve recognition error, and the series of processes is ended.

On the other hand, when the determination result of step S27 is "NO", the process proceeds to step S30. In step S30, the curve information is extracted from the estimated curve shape. Then, in step S29, the extracted curve information is newly stored in the storage portion 11, and the series of processes is ended.

Also, in step S31, it is determined whether or not the matching normal state has been continued.

When the determination result is "NO", the process proceeds to step S34 described below.

On the other hand, when the determination result is "YES", the process proceeds to step S32.

In step S32, it is determined that the self-vehicle is traveling on a road outside the predicted course, and the process proceeds to step S33. In step S33, this road outside the predicted course is changed so as to be predicted as the predicted course during the next travel, and the series of processes is ended.

In step S34, it is determined whether or not a matching abnormal state has been continued.

When the determination result is "NO", the series of processes is ended.

On the other hand, when the determination result is "YES", the process proceeds to step S35. In step S35, it is determined that the self-vehicle is traveling on a road for which corresponding road data does not exist (new road), and the process proceeds to step S36.

In step S36, a change is made so as to predict the new road as the predicted course during the next travel, and the series of processes is ended.

As described above, in the case that the safety device 21 does not operate for an estimated curve and also deceleration of a predetermined value or greater occurs by a deceleration operation of the driver before entering the estimated curve or while traveling through it, the vehicle travel safety device 10 of the present embodiment corrects the road data so as to facilitate operation of the operating portion 20 for a curve where the operating portion 20 is determined to be inactive. Thereby, even in a state where for example the curve shape cannot be recognized from the road data, it is possible to improve the road shape recognition accuracy and it is possible to properly reflect the will of the driver in the travel state of the vehicle while passing through the curve.

Also, in the case that the safety device 21 does not operate for an estimated curve and also the vehicle condition of the self-vehicle is not in the proper vehicle condition to be able to properly pass the estimated curve, this vehicle travel safety device 10 corrects the road data to facilitate operation of the operating portion 20 for a curve where the operating portion 20 is determined to be inactive. Thereby, even in a state where a curve shape cannot be recognized from the road data, it is possible to improve the road shape recognition accuracy and it is possible to properly pass through the curve.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle travel safety device comprising:
    a storage portion that stores node information and curve information from roads as road data;
    a self-vehicle position detecting portion that detects the position of a self-vehicle;
    a curve recognizing portion that recognizes the shape of a curve that exists in the traveling direction of the self-vehicle based on the road data;
    a vehicle condition detecting portion that detects the vehicle condition of the self-vehicle;
    a proper vehicle condition setting portion that sets a proper vehicle condition to be able to properly pass a curve based on the shape of the curve recognized by the curve recognizing portion;
    a comparing portion that compares the vehicle condition detected by the vehicle condition detecting portion and the proper vehicle condition set by the proper vehicle condition setting portion;
    an operating portion that operates a safety device provided in the self-vehicle when the vehicle condition of the self-vehicle is not in the proper vehicle condition according to the comparison result of the comparing portion;
    an operation presence determining portion that determines the presence or absence of an operation of the operating portion; and
    a correcting portion that corrects the road data so as to facilitate operation of the operating portion at a curve where the operating portion is determined to be inactive according to the determination result of the operation presence determining portion,
    wherein the operation presence determining portion determines that the operating portion is inactive when the safety device does not operate for a recognized curve that is recognized by the curve recognizing portion and also deceleration of a predetermined amount or more occurs by a deceleration operation of the driver before entering the recognized curve or while traveling through it.

2. The vehicle travel safety device according to claim 1, wherein the vehicle condition is defined by at least one of vehicle speed, wheel speed, yaw rate, and lateral acceleration.

3. The vehicle travel safety device according to claim 1, further comprising:
    a course predicting portion that predicts the course of the self-vehicle based on the road data; and
    a predicted course changing portion that changes the predicted course predicted by the course predicting portion,
    wherein the operation presence determining portion determines that the operating portion is inactive when, due to the actual route on which the self-vehicle is traveling differing from the predicted course predicted by the course predicting portion, the safety device does not operate for a curve on the actual route and also deceleration of a predetermined amount or more occurs by a deceleration operation of the driver before entering the curve on the actual route or while traveling through it, and
    the predicted course changing portion changes the predicted course predicted by the course predicting portion so that the operating portion operates for the curve on the actual route during the next travel in the case that the operating portion is determined to be inactive for the curve on the actual route by the operation presence determining portion.

4. The vehicle travel safety device according to claim 1, further comprising:
    a course predicting portion that predicts the course of the self-vehicle based on the road data; and
    a predicted course changing portion that changes the predicted course predicted by the course predicting portion,
    wherein the operation presence determining portion determines that the operating portion is inactive when, due to the actual route on which the self-vehicle is traveling differing from the predicted course predicted by the course predicting portion, the safety device does not operate for a curve on the actual route and also the lateral acceleration of the self-vehicle when passing through the curve on the actual route is greater than the proper lateral acceleration set by the proper vehicle condition setting portion by a predetermined value or more, and
    the predicted course changing portion changes the predicted course predicted by the course predicting portion so that the operating portion operates for the curve on the actual route during the next travel in the case that the operating portion is determined to be inactive for the curve on the actual route by the operation presence determining portion.

5. A vehicle travel safety device comprising:
    a storage portion that stores node information and curve information according to roads as road data;
    a self-vehicle position detecting portion that detects the position of a self-vehicle;

a curve recognizing portion that recognizes the shape of a curve that exists in the traveling direction of the self-vehicle based on the road data;

a vehicle condition detecting portion that detects the vehicle condition of the self-vehicle;

a proper vehicle condition setting portion that sets a proper vehicle condition to be able to properly pass a curve based on the shape of the curve recognized by the curve recognizing portion;

a comparing portion that compares the vehicle condition detected by the vehicle condition detecting portion and the proper vehicle condition set by the proper vehicle condition setting portion;

an operating portion that operates a safety device provided in the self-vehicle when the vehicle condition of the self-vehicle is not in the proper vehicle condition according to the comparison result of the comparing portion;

an operation presence determining portion that determines the presence or absence of an operation of the operating portion; and a correcting portion that corrects the road data so as to facilitate operation by the operating portion at a curve where the operating portion is determined to be inactive according to the determination result of the operation presence determining portion, wherein the operation presence determining portion determines that the operating portion is inactive when the safety device does not operate for a recognized curve that is recognized by the curve recognizing portion and also the lateral acceleration of the self-vehicle at the time of passing the recognized curve is greater than a proper lateral acceleration that is set by the proper vehicle condition setting portion by a predetermined amount or more.

6. The vehicle travel safety device according to claim 5, wherein the vehicle condition is defined by at least one of vehicle speed, wheel speed, yaw rate, and lateral acceleration.

7. The vehicle travel safety device according to claim 5, further comprising:

a course predicting portion that predicts the course of the self-vehicle based on the road data; and a predicted course changing portion that changes the predicted course predicted by the course predicting portion, wherein the operation presence determining portion determines that the operating portion is inactive when, due to the actual route on which the self-vehicle is traveling differing from the predicted course predicted by the course predicting portion, the safety device does not operate for a curve on the actual route and also deceleration of a predetermined amount or more occurs by a deceleration operation of the driver before entering the curve on the actual route or while traveling through it, and the predicted course changing portion changes the predicted course predicted by the course predicting portion so that the operating portion operates for the curve on the actual route during the next travel in the case that the operating portion is determined to be inactive for the curve on the actual route by the operation presence determining portion.

8. The vehicle travel safety device according to claim 5, further comprising:

a course predicting portion that predicts the course of the self-vehicle based on the road data; and a predicted course changing portion that changes the predicted course predicted by the course predicting portion, wherein the operation presence determining portion determines that the operating portion is inactive when, due to the actual route on which the self-vehicle is traveling differing from the predicted course predicted by the course predicting portion, the safety device does not operate for a curve on the actual route and also the lateral acceleration of the self-vehicle when passing through the curve on the actual route is greater than the proper lateral acceleration set by the proper vehicle condition setting portion by a predetermined value or more, and the predicted course changing portion changes the predicted course predicted by the course predicting portion so that the operating portion operates for the curve on the actual route during the next travel in the case that the operating portion is determined to be inactive for the curve on the actual route by the operation presence determining portion.

9. A vehicle travel safety device comprising:

a storage portion that stores node information and curve information according to roads as road data;

a self-vehicle position detecting portion that detects the position of a self-vehicle;

a curve recognizing portion that recognizes the shape of a curve that exists in the traveling direction of the self-vehicle based on the road data;

a vehicle condition detecting portion that detects the vehicle condition of the self-vehicle;

a first proper vehicle condition setting portion that sets a first proper vehicle condition to be able to properly pass a curve based on the shape of the curve recognized by the curve recognizing portion;

a comparing portion that compares the vehicle condition detected by the vehicle condition detecting portion and the first proper vehicle condition set by the first proper vehicle condition setting portion;

an operating portion that operates a safety device provided in the self-vehicle when the vehicle condition of the self-vehicle is not in the first proper vehicle condition according to the comparison result of the comparing portion;

a curve estimating portion that estimates an actual curve shape and actual curve position based on the vehicle condition of the self-vehicle;

an operation presence determining portion that determines the presence or absence of an operation of the operating portion;

a correcting portion that corrects the road data so as to facilitate operation by the operating portion at a curve where the operating portion is determined to be inactive according to the determination result of the operation presence determining portion; and a second proper vehicle condition setting portion that sets a second proper vehicle condition to be able to properly pass the estimated curve based on the shape of the estimated curve estimated by the curve estimating portion, wherein the operation presence determining portion determines that the operating portion is inactive when the safety device does not operate for the estimated curve that is estimated by the curve estimating portion and also the vehicle condition of the self-vehicle is not in the second proper vehicle condition.

10. The vehicle travel safety device according to claim 9, wherein the vehicle condition is defined by at least one of vehicle speed, wheel speed, yaw rate, and lateral acceleration.

11. The vehicle travel safety device according to claim 9, wherein the second proper vehicle condition setting portion sets a proper speed as the second proper vehicle condition; and the operation presence determining portion determines that the operating portion is inactive when the safety device does not operate for the estimated curve that is estimated by the curve estimating portion and also the speed of the self-vehicle when passing through the estimated curve is greater than the proper speed by a predetermined value or more.

12. The vehicle travel safety device according to claim 9, wherein the second proper vehicle condition setting portion sets a proper lateral acceleration as the second proper vehicle condition; and the operation presence determining portion determines that the operating portion is inactive when the safety device does not operate for the estimated curve that is estimated by the curve estimating portion and also the lateral acceleration of the self-vehicle when passing through the estimated curve is greater than the proper lateral acceleration by a predetermined value or more.

13. The vehicle travel safety device according to claim 9, further comprising:

a course predicting portion that predicts the course of the self-vehicle based on the road data; and a predicted course changing portion that changes the predicted course predicted by the course predicting portion, wherein the operation presence determining portion determines that the operating portion is inactive when, due to the actual route on which the self-vehicle is traveling differing from the predicted course predicted by the course predicting portion, the safety device does not operate for a curve on the actual route and also deceleration of a predetermined amount or more occurs by a deceleration operation of the driver before entering the curve on the actual route or while traveling through it, and the predicted course changing portion changes the predicted course predicted by the course predicting portion so that the operating portion operates for the curve on the actual route during the next travel in the case that the operating portion is determined to be inactive for the curve on the actual route by the operation presence determining portion.

14. The vehicle travel safety device according to claim 9, further comprising:

a course predicting portion that predicts the course of the self-vehicle based on the road data; and a predicted course changing portion that changes the predicted course predicted by the course predicting portion, wherein the operation presence determining portion determines that the operating portion is inactive when, due to the actual route on which the self-vehicle is traveling differing from the predicted course predicted by the course predicting portion, the safety device does not operate for a curve on the actual route and also the lateral acceleration of the self-vehicle when passing through the curve on the actual route is greater than the proper lateral acceleration set by the proper vehicle condition setting portion by a predetermined value or more, and the predicted course changing portion changes the predicted course predicted by the course predicting portion so that the operating portion operates for the curve on the actual route during the next travel in the case that the operating portion is determined to be inactive for the curve on the actual route by the operation presence determining portion.

* * * * *